United States Patent [19]
Gordon

[11] 3,934,082
[45] Jan. 20, 1976

[54] POST DETECTION DEVICE FOR ELIMINATING BACKSCATTER

[75] Inventor: Alan Gordon, San Diego, Calif.

[73] Assignee: The United States of America as represented by the Secretary of the Navy, Washington, D.C.

[22] Filed: Aug. 12, 1974

[21] Appl. No.: 496,598

[52] U.S. Cl. ............... 178/6; 178/6.8; 178/7.1; 178/7.2; 340/4 R
[51] Int. Cl.² ............................... H04N 7/18
[58] Field of Search ............... 178/6, 6.8, 7.1, 7.2; 340/4 R

[56] References Cited
UNITED STATES PATENTS

| | | | |
|---|---|---|---|
| 3,333,055 | 7/1967 | Krause | 178/6 |
| 3,639,687 | 2/1972 | Danell | 178/6 |
| 3,723,648 | 3/1973 | Cornsweet | 178/6.8 |

*Primary Examiner*—Robert L. Griffin
*Assistant Examiner*—Edward L. Coles
*Attorney, Agent, or Firm*—Richard S. Sciascia; Ervin F. Johnston; William T. Skeer

[57] ABSTRACT

The deleterious effects of backscattering on a video image received from a turbid environment is minimized by using a vertical raster scan combined with appropriate filtering between the camera and monitor.

2 Claims, 3 Drawing Figures

POST DETECTION DEVICE FOR ELIMINATING BACKSCATTER

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to video imaging techniques. In greater particularity, the invention pertains to the transmission and monitoring of video images in a turbid medium or other mediums having a high incidence of illumination backscatter. In still greater particularity, but without limitation thereto, the invention pertains to video imaging techniques used in underwater environments.

DESCRIPTION OF THE PRIOR ART

The use of closed circuit television and other active imaging systems is well known in environments, such as underwater, that are difficult for man to investigate directly. In many such applications, the medium of the environment causes spurious reflections which degrade the image quality.

A variety of prior art techniques have been employed to minimize or overcome the degradation of image quality caused by backscattering. Such prior art systems have employed time-gated television systems, narrow-beam illumination systems, that synchronously scan the object field, and thresholding systems. Although each of these prior art types of backscatter correction have met with varying degrees of success and are advantageously employed in many circumstances, they all involve the use of expensive, fragile, and specialized equipment. Despite their success and specialized applicability, a need remains for a low cost system which minimizes or reduces the backscatter for general application systems.

SUMMARY OF THE INVENTION

This invention provides a low cost and simplified solution to the aforedescribed backscattering problem by the use of a vertical image raster line combined with appropriate filtering between the detector and the video monitor. This arrangement is particularly adapted for underwater remote vehicles wherein the illumination source is horizontally disposed with respect to the detector.

STATEMENT OF THE OBJECTS OF THE INVENTION

It is accordingly an object of this invention to provide an improved video system.

Another object of this invention is to provide a video system having improved performance in backscattering environments.

Yet another object of this invention is to provide an improved video detection system for use in underwater applications.

Another object of this invention is to provide an underwater, closed circuit television system having minimal sensitivity to backscattered light.

Another object of this invention is to provide an underwater, closed circuit television system for use with horizontally disposed illumination systems which minimizes backscatter from the illumination source.

These and other objects of the invention will become more readily apparent from the ensuing specification when taken together with the drawings.

DESCRIPTION OF THE PREFERRED EMBODIMENT

Figure 1:
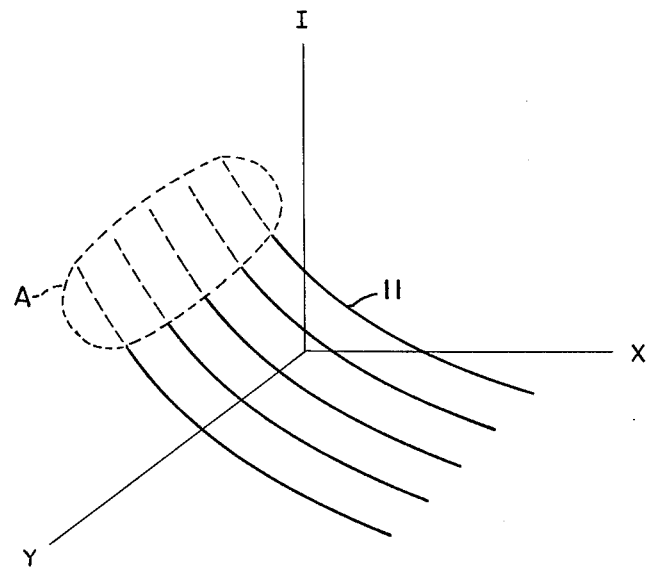
FIG. 1 is a graphic representation of conventional raster scan being affected by backscatter.

Referring to FIG. 1, a three dimensional plot of a conventional, underwater television system in a backscattering medium is shown. The plurality of raster lines are plotted as a series of parallel curves 11. As will be well understood, the five lines illustrated are merely a portion of the complete raster which customarily has over 400 lines to complete an image frame. The backscattering components on each of these lines constitute small intensity excursions having a high-frequency component. Because of the large change in amplitude in region A, both the desired signal and the backscatter have significant, high-frequency components. Therefore, little improvement may be had by processing the raster lines on a line-by-line basis.

It should be understood, that the aforedescribed graphic representation corresponds to a horizontal placement of the illumination source with respect to the detector, or camera, in an underwater environment. In the illustrated arrangement, the curves have been drawn to illustrate a classic case of the use of a rectangular, beam shape for both the illumination souce and the field of view of the detection system. If a conical illumination beam is used, there will also be backscatter in the mid-portion of the individual raster lines. Such principles are well understood in the underwater imaging arts. However, for a more complete description of this phenomena, including a mathematical treatment of the backscattering phenomena, attention is invited to "Handbook of Underwater Imaging System Design", by C. Funk, S. Bryant, and P. Heckman, Jr., published by the Naval Undersea Center, July 1972.

It should also be understood that the horizontal location of illuminating light sources and television cameras and other underwater active detection systems is conventional in the underwater arts. This convention is largely occasioned by the need for freeing the upper portion of the underwater vehicle bearing the image system to permit handling from surface vessels by conventional, marine handling apparatus. Similarly, because such vehicles work in close proximity to the sea floor, vertically depending light sources are seldom employed. As an example of such an illumination-detector arrangement designed for underwater applications, attention is invited to U.S. Pat. No. 3,757,042 issued on Sept. 4, 1973 to Clarence J. Funk for "Pan and Tilt Underwater Optical Viewing System with Adjustable Source-Receiver Separation and Zoom Lenses".

Figure 2:
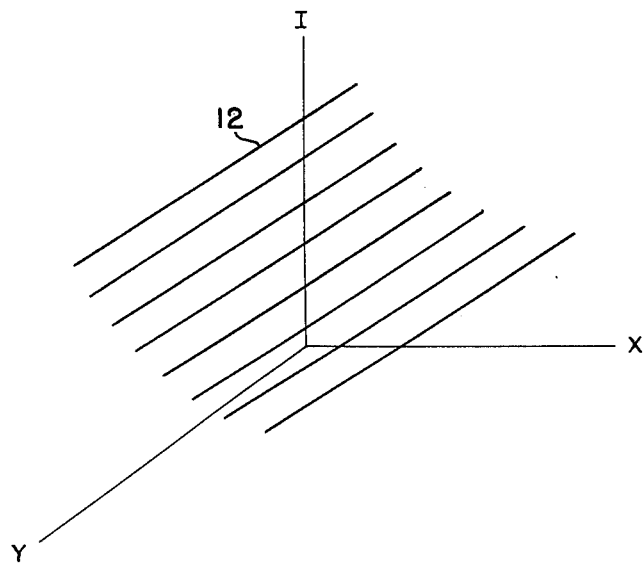
FIG. 2 is a graphic representation of a vertical scan having been processed according to the invention.

Referring to FIG. 2, the effect of changing the scan raster to a vertical arrangement is illustrated. As may be seen, using a vertical raster, the individual raster lines 12 now approximately parallel the Y axis and, although they are arranged to show the same intensity pattern, it will be noted that any backscatter caused noise on the individual lines is now along the general direction of the line, such that it has only low frequency components. This permits individual raster lines 12 to be filtered such as to remove low-frequency components therefrom without disturbances of their high-frequency component effecting the image intensity represented by the individual raster line giving a greater signal-to-noise ratio. Thus, this system is remarkably effective for underwater vehicles operating in close proximity to the sea floor where object recognition is mainly dependent upon accurate representations of silhouette outlines of objects standing proud from the ocean bottom.

Figure 3:
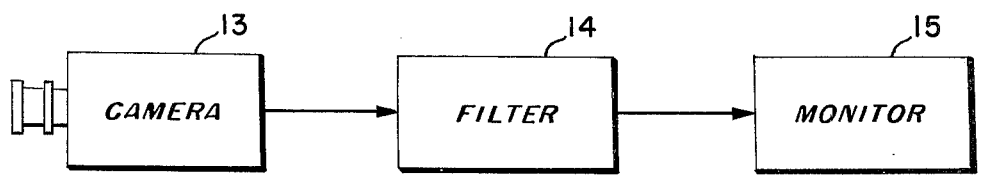
FIG. 3 is a diagrammatic showing of the basic components comprising the invention.

Referring to FIG. 3, a diagrammatic illustration of a system embodying the invention is illustrated. A camera 13 is oriented or otherwise adjusted by relocation of the deflection circuitry to produce a vertical scan raster, a high-pass filter 14 filters the video output of camera 13 on a line-by-line basis and feeds this filtered, or processed output to a conventional monitor 15, similarly modified to exhibit a vertical raster. The vertical line raster may be obtained by rotation of the deflection coils of the camera and monitor. In its simplest form, the invention may be practiced by merely rotating camera 13 and monitor 14 by 90° and then inserting the high-pass filter 14 in the transmission network. Such a modification may be very simply incorporated in low-cost, underwater viewing equipment now in use with attendant improvement of backscatter elimination.

Obviously, many modifications and variations of the present invention are possible in the light of the above teachings, and, it is therefore understood that within the scope of the disclosed inventive concept, the invention may be practiced otherwise than specifically described.

What is claimed is:

1. In a method for remote viewing in an underwater environment having high backscatter employing a television camera, illumination means displaced from said television camera, the improvement comprising:
    causing the raster lines of said television camera to extend in a vertical direction at right angles to the direction of displacement of said illumination source from said television camera;
    filtering the output of said television camera to prevent the passage of low frequencies; and
    causing the raster lines of a monitor receiver effectively connected to said television camera to extend in the same direction as those of the camera, whereby backscatter from the illumination source is effectively reduced.

2. A remote viewing system for environments having high backscatter comprising:
    an underwater television camera displaced from a source of illumination for eliminating backscatter having raster lines extending in a vertical direction at right angles to the direction of displacement;
    a filter connected to the camera to limit the frequency output thereof to a predetermined bandwidth; and
    a monitor connected to said filter to display the filtered output thereof and having a raster corresponding to said television camera including vertically extending raster lines.

* * * * *